(12) United States Patent
Wagner et al.

(10) Patent No.: US 6,330,386 B1
(45) Date of Patent: Dec. 11, 2001

(54) LIGHTENING UNIT

(75) Inventors: Arndt Wagner; Gunther Haas, both of Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/331,143

(22) PCT Filed: Oct. 9, 1997

(86) PCT No.: PCT/DE97/02307

§ 371 Date: Sep. 22, 1999

§ 102(e) Date: Sep. 22, 1999

(87) PCT Pub. No.: WO98/27382

PCT Pub. Date: Jun. 25, 1998

(30) Foreign Application Priority Data

Dec. 16, 1996 (DE) .............................................. 196 52 209

(51) Int. Cl.⁷ .............................. G02B 6/10; F21V 8/00; G02F 1/1335

(52) U.S. Cl. .......................... 385/120; 385/129; 385/901; 362/26; 362/31; 362/32; 362/33; 349/63; 349/64; 349/65; 349/70

(58) Field of Search ..................................... 385/120, 129, 385/146, 901; 362/26, 31, 32, 33; 349/62, 63, 64, 65, 67, 70, 159, 160

(56) References Cited

U.S. PATENT DOCUMENTS

| 4,368,504 | * | 1/1983 | Sato et al. | 362/33 |
|---|---|---|---|---|
| 4,673,254 | * | 6/1987 | Kato et al. | 362/297 |
| 5,005,108 | * | 4/1991 | Pristash et al. | 362/31 |
| 5,057,974 | * | 10/1991 | Mizobe | 362/26 |
| 5,390,085 | * | 2/1995 | Mari-Roca et al. | 362/31 |
| 5,390,276 | * | 2/1995 | Tai et al. | 385/146 |
| 5,594,830 | * | 1/1997 | Winston et al. | 385/146 |
| 5,667,289 | * | 9/1997 | Akahane et al. | 362/31 |
| 5,771,328 | * | 6/1998 | Wortman et al. | 385/146 |
| 5,926,601 | * | 7/1999 | Tai et al. | 385/146 |
| 5,949,505 | * | 9/1999 | Funamoto et al. | 349/65 |

FOREIGN PATENT DOCUMENTS

| 40 08 953 | | 9/1990 | (DE) . |
|---|---|---|---|
| 544 332 | | 6/1993 | (EP) . |
| 544332 A1 | * | 6/1993 | (EP) . |
| 773 402 | | 5/1997 | (EP) . |

* cited by examiner

Primary Examiner—Jon Henry
(74) Attorney, Agent, or Firm—Kenyon & Kenyon (57) ABSTRACT

A backlighting unit for planar and homogeneous illumination has a cold-cathode fluorescent lamp that is mounted one narrow side of a waveguide plate. The light emitted from the backlighting unit is emitted from one of the two large surfaces of the waveguide plate. The light is deflected from one narrow side to one large surface by prisms which are also mounted on one large surface. To homogenize the emitted light, the prisms are arranged in irregular fashion. Homogenization is advantageous in particular if an L-shaped or U-shaped lamp, which illuminates several narrow sides of the waveguide plate, is used as the lamp.

16 Claims, 5 Drawing Sheets

LIGHTENING UNIT

FIELD OF THE INVENTION

The present invention relates to a backlighting unit.

BACKGROUND INFORMATION

A conventional backlighting unit is described in U.S. Pat. No. 5,390,276. The principal element of this backlighting unit is a light guide, made of transparent material (for example Plexiglas), which possesses roughly the shape of a parallelepipedal plate. One of the end surfaces is used as a light entry surface, and the other end surfaces are treated, for example by metal-coating, in such a way that no light can emerge through them from the light guide. One of the two large covering surfaces is configured as a light exit surface, and small prisms are applied on the other large covering surface. The prisms all have the same cross-sectional shape and cross-sectional area, and all extend parallel to the light entry surface. The lamp is located in the immediate vicinity of the light entry surface. A cold-cathode fluorescent lamp, in the form of an elongated tube, is used as the lamp. The lamp is arranged in front of the light entry opening in such a way that as large a percentage as possible of the light radiation generated by the lamp is coupled into the waveguide. A reflector, which also conveys to the waveguide the light that is not irradiated directly into the waveguide, is additionally provided on the side of the lamp facing away from the waveguide.

As a result of the prisms arranged on the underside of the waveguide, the light present in the waveguide is coupled out in particularly efficient fashion by the fact that the light is reflected from the prisms applied on the one covering surface to the opposing covering surface, from which it can then emerge. It is important to consider in the case of this arrangement, however, that the coupling-out efficiency is the same over the entire waveguide. If the rod-shaped lamp is thus replaced, for example, by an L-shaped or U-shaped tube, and if several end surfaces are thus used as light entry surfaces, the result is an inhomogeneous distribution of the light intensity in the waveguide. The homogeneous coupling-out efficiency thus results in inhomogeneous backlighting. On the other hand, however, the use of L-shaped or U-shaped tubes is desirable, since they are particularly efficient.

SUMMARY OF THE INVENTION

The backlighting unit according to the present invention has, in contrast, the advantage that it can supply high-intensity light which at the same time possesses an extremely homogeneous intensity distribution. This is advantageous, for example, for installation in liquid crystal displays for motor vehicles.

It is particularly advantageous to furnish prisms having the same cross-sectional shape, since the light intensity thus has at all points the same dependency on the angle of view.

DETAILED DESCRIPTION

Figure 1A:
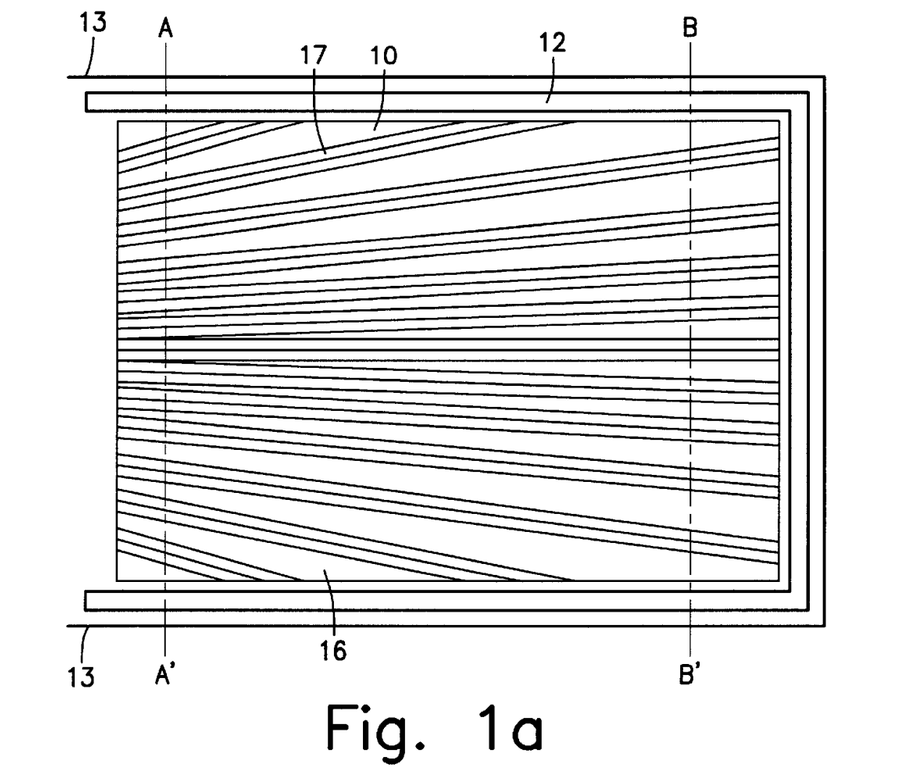
FIG. 1A shows a first exemplary embodiment of a backlighting element according to the present invention.

FIG. 1A shows a first backlighting element. The backlighting element has a waveguide plate 10 which is configured as an approximately parallelepipedal plate made of Plexiglas.

Other materials for the waveguide plate are conceivable, however, and provision is made therefor, if they have the requisite high transparency. Waveguide plate 10 is surrounded on three of its narrow sides by a U-shaped light source 12. The light source is in turn enclosed by a reflector 13, also U-shaped. On its underside 16, which is intended to be visible in the depiction selected here, waveguide plate 10 has prisms 17. Prisms 17 all have the same cross-sectional shape and the same cross-sectional dimensions. All the prisms are assumed to be linear (i.e. the ridge lines of the prisms are straight lines). The arrangement of the prisms is approximately star-shaped, the center point of the star being located on the center perpendicular through the center part of the U-shaped light source 12, far outside the dimensions of waveguide 10.

Figure 1B:
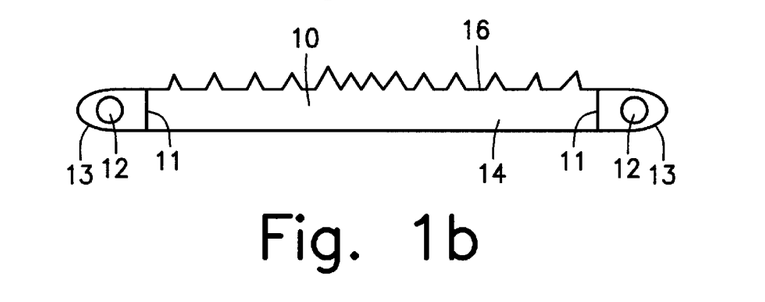
FIG. 1B shows a cross-section of the backlighting unit illustrated in FIG. 1A along AA' line.

A first cross section through the backlighting unit shown in FIG. 1A along section line AA', which is also shown in FIG. 1A, is depicted in FIG. 1B, identical components having been labeled with identical reference characters.

Figure 1C:
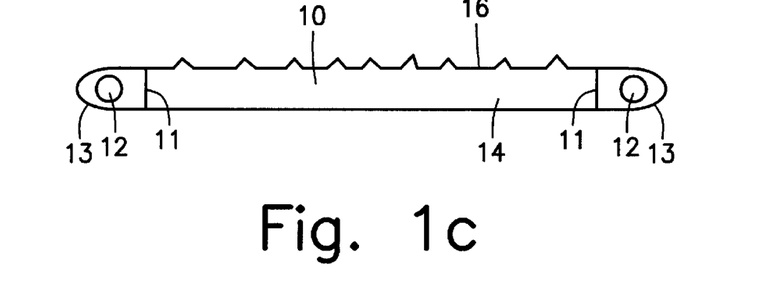
FIG. 1C shows a cross-section of the backlighting unit illustrated in FIG. 1A along BB' line.

FIG. 1C reproduces a further cross section through the backlighting unit depicted in FIG. 1A, in this case along the second section line BB'. Once again, identical reference characters refer to identical components.

Light which is emitted from light source 12 moves approximately parallel to light exit surface 14 in waveguide plate 10. When this light strikes the light exit surface it is totally reflected; when it strikes the narrow side located opposite, it is reflected back by reflector 13. But if this light strikes one of prisms 17, it is deflected and thus strikes light exit surface 14 at an angle which is less than the critical angle for total reflection. The probability of a light beam striking a prism 17 is thus also an indication of the efficiency with which light is coupled out of waveguide plate 10. In the exemplary embodiment shown in FIGS. 1A–1C, the inhomogeneous light intensity distribution in waveguide plate 10 resulting from the U-shaped configuration of light source 12 is compensated for by the fact that the coupling-out efficiency is greater in those parts of the waveguide plate where the intensity of the light is lower.

It is not essential for the present invention that these prisms be linear. In particular, it is also conceivable, and provision is made therefor, for the ridge lines of the prisms approximately to follow the gradient of light intensity in the waveguide plate. It is also conceivable, and provision is made therefor, for the prisms not to have a triangular cross-sectional shape. In particular, a double-parabolic cross-sectional shape is advantageous, since it allows collimation of the coupled-out light. Further possible variants of the backlighting unit according to the present invention result from the fact that the inhomogeneity in the backlighting is not completely compensated for, by way of a coupling-out efficiency which varies over the dimensions of the waveguide. This is desirable in particular if the backlighting unit is used to backlight a liquid crystal display, and the liquid crystal display is not meant to have a uniform light intensity throughout.

Figure 2A:
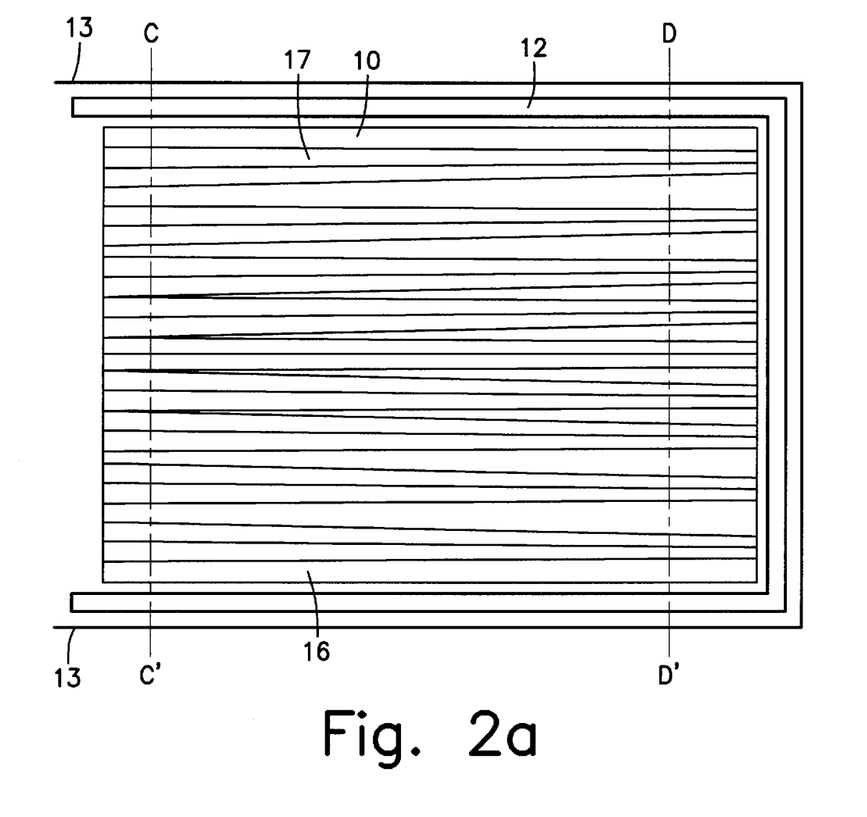
FIG. 2A shows a second exemplary embodiment of the backlighting element according to the present invention.
Figure 2B:
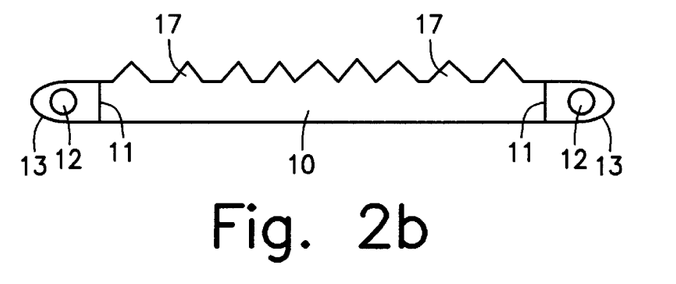
FIG. 2B shows a cross-section of the backlighting unit illustrated in FIG. 2A along CC' line.
Figure 2C:
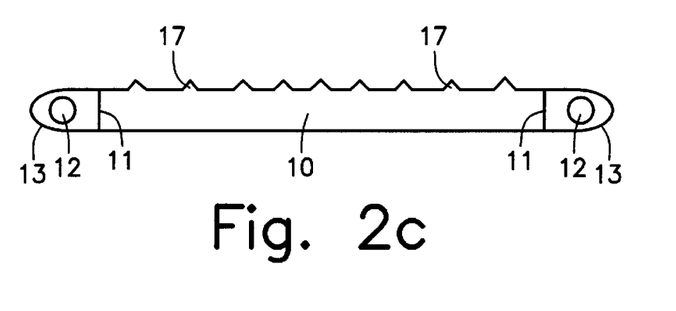
FIG. 2C shows a cross-section of the backlighting unit illustrated in FIG. 2A along DD' line.

A further exemplary embodiment is shown in FIGS. 2A through 2C. FIG. 2A shows a plan view of a backlighting unit. The backlighting unit once again has an approximately parallelepipedal waveguide plate made of a transparent material, for example Plexiglas. As in FIG. 1A, waveguide plate 10 is surrounded on three of its end faces by a light source 12, behind which is located a reflector 13. Underside 16 of waveguide plate 10 visible in FIG. 2A is equipped with linear prisms 17 which are all arranged along the longitudinal axis (i.e. parallel to the two arms of the U-shaped light source 12). Prisms 17 are linear prisms, and have the same cross-sectional shape throughout, both with respect to one another and along their longitudinal axis. The cross-sectional area of the prisms varies, however, both among the individual prisms and within one prism along the longitudinal axis. The cross-sectional area is greatest in the center of that end surface of waveguide plate 10 which is not equipped with a light source, and decreases continuously from there in all directions.

This is also illustrated in the two cross-sectional drawings in FIG. 2B and FIG. 2C.

FIG. 2B shows a section through the backlighting unit depicted in FIG. 2A, along section line C'C also depicted in FIG. 2A, identical components having been given identical reference characters.

FIG. 2C shows a further section through the backlighting unit depicted in FIG. 2A, in this case along section line DD' which is also shown in FIG. 2A.

For a functional description of the backlighting unit depicted in FIG. 2A, reference is made to the description of the backlighting unit depicted in FIG. 1A. Once again, the light emitted from the backlighting unit is homogenized by the fact that the coupling-out efficiency from waveguide plate 10 is greatest at that point where the light intensity is lowest. In the backlighting unit shown in FIG. 2A, however, the coupling-out efficiency is determined not by the number of prisms but by the dimensions of the prisms, the coupling-out efficiency rising as the cross-sectional area of the prisms increases. It must be considered in this context, however, that the coupling-out efficiency reaches a saturation range when adjacent prisms intersect.

It is advantageous if the arrangement of prisms exhibits at least the same symmetry elements as the lamp, the reflector, and the waveguide plate without prisms. It thereby is possible, with relatively little outlay, to achieve a high degree of homogeneity in the emitted light. It is also possible, however, to select an asymmetrical prism arrangement, especially in terms of the longitudinal axis of the backlighting unit. In this case the intensity distribution of the light emitted from the backlighting unit is also not completely homogeneous. In this fashion it is possible, and provision is made therefor, to deliberately generate inhomogeneities which replace the inhomogeneities generated by light source 12. It is also possible, however, and provision is made therefor, to compensate for the asymmetrical distribution of the prisms, by selecting the cross-sectional areas appropriately, in such a way that the backlighting unit once again emits homogeneous light.

It is furthermore possible, and provision is made therefor, to configure prisms 17 as prisms whose ridge lines are curved.

Figure 3A:
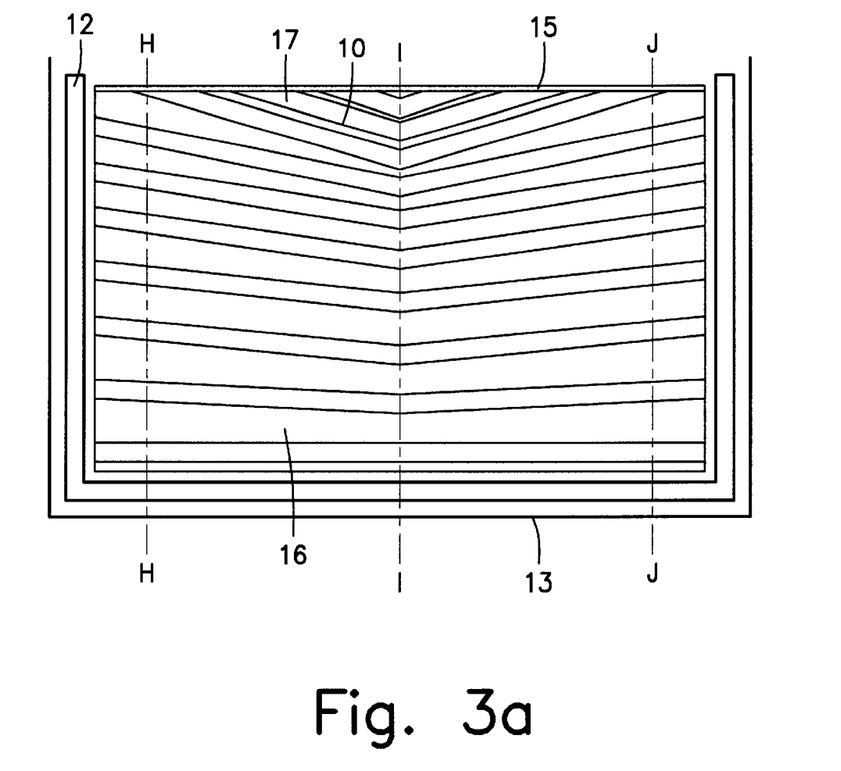
FIG. 3A shows a third exemplary embodiment of the backlighting element according to the present invention.
Figure 3B:
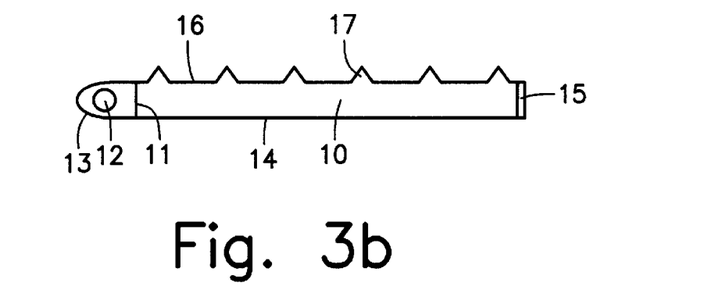
FIG. 3B shows a cross-section of the backlighting unit illustrated in FIG. 3A along HH' line.
Figure 3C:
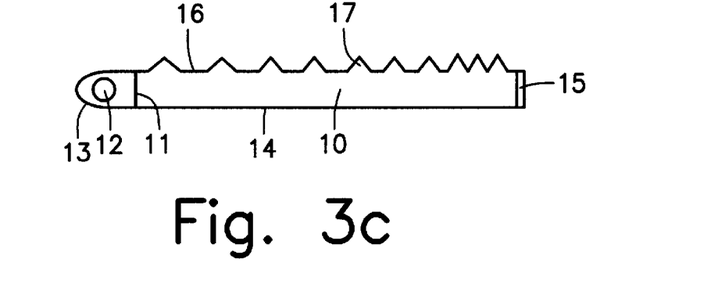
FIG. 3C shows a cross-section of the backlighting unit illustrated in FIG. 3A along II' line.

A further exemplary embodiment is shown in FIGS. 3A through 3C. FIG. 3A shows a plan view of a backlighting unit. The backlighting unit once again has an approximately parallelepipedal waveguide plate 10 made of a transparent material, for example Plexiglas. As in FIG. 1A, waveguide plate 10 is surrounded on three of its end faces by a light source 12, behind which is located a reflector 13. In contrast to the previous Figures, light source 12 surrounds one long side and two short sides of waveguide plate 10. Underside 16 of waveguide plate 10, visible in FIG. 3A, is equipped with prisms 17 whose ridge lines are V-shaped, the mirror axes of the prisms being arranged congruently with the longitudinal axis of light source 12 (i.e. parallel to the two arms of the U-shaped light source 12). The prisms have the same cross-sectional shape and cross-sectional area throughout, both with respect to one another and also along their longitudinal axis (with the exception of the inflection region, in which the cross-sectional shape is more complex).

The spacing between the prisms is smaller in the region of waveguide plate 10 which is located farthest from light source 12.

This is also illustrated in the two cross-sections in FIGS. 3B and 3C.

FIG. 3B shows a section through the backlighting unit depicted in FIG. 3A along section line HH' which is also depicted in FIG. 3A, identical components having been given identical reference characters.

FIG. 3C shows a further section through the backlighting unit depicted in FIG. 3A, in this case along section line II' which is also reproduced in FIG. 3A.

For a functional description of the backlighting unit depicted in FIG. 3A, reference is made to the description of the backlighting unit depicted in FIG. 1A. Once again, the light emitted from the backlighting unit is homogenized by the fact that the coupling-out efficiency from waveguide plate 10 is greatest at that point where the light intensity is lowest. As was already the case in the exemplary embodiment shown in FIG. 1A, the coupling-out efficiency is increased by decreasing the spacings between the prisms. In contrast to the exemplary embodiment shown in FIG. 1A, in this case the ridge lines are arranged approximately perpendicular to the gradient (along the so-called equal-intensity lines) of the light intensity in waveguide plate 10, the coupling-out coefficient being increased along the gradient by increasing the prism density.

As a modification of the exemplary embodiment in FIG. 3A, it is conceivable, and provision is made therefor, to provide curved ridge lines for the prisms so that the prisms are guided more closely along the equal-intensity lines.

Figure 4A:
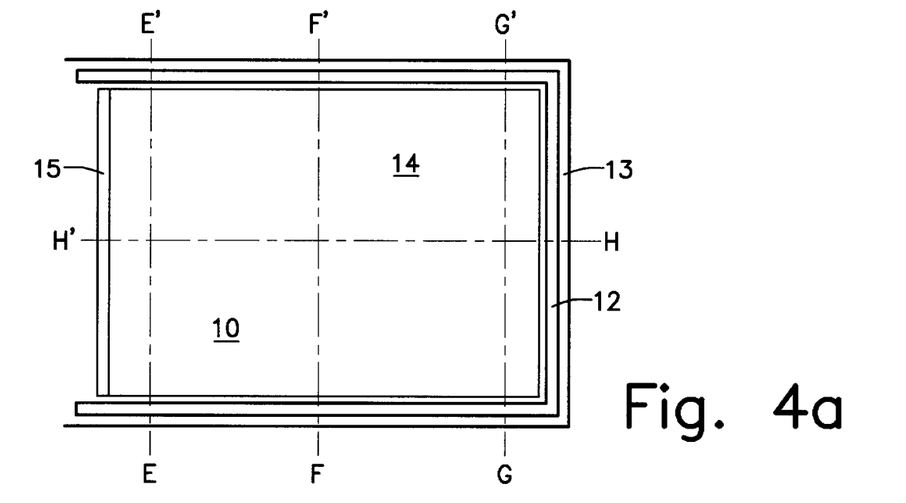
FIG. 4A shows a second exemplary embodiment of the backlighting element according to the present invention.

FIG. 4A shows a further exemplary embodiment of a backlighting unit according to the present invention, in a plan view of light exit surface 14. The backlighting unit once again has an approximately parallelepipedal waveguide plate 10 which is made from transparent material. Prisms 17 are not visible in this depiction, since they are located on the underside. Waveguide plate 10 is once again surrounded on three sides by a U-shaped light source 12 which in turn is surrounded by a reflector 13. A reflective layer 15 is applied on the end face of waveguide plate 10 which is not equipped with a light source 12. The backlighting unit depicted in FIG. 4A is then depicted in four different sectional views.

Figure 4B:
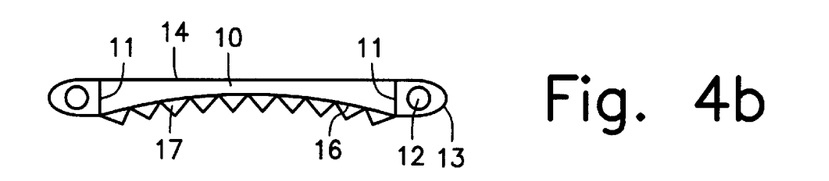
FIG. 4B shows a cross-section of the backlighting unit illustrated in FIG. 4A along EE' line.

FIG. 4B shows a first section through the backlighting unit depicted in FIG. 4A, along section line EE' which is located closest to reflective layer 15.

Figure 4C:
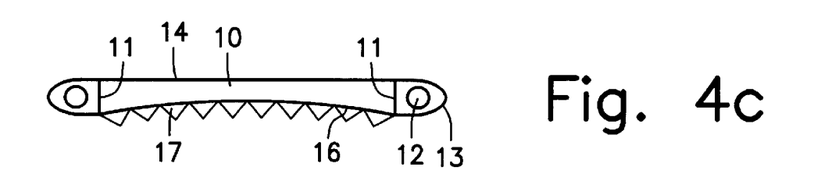
FIG. 4C shows a cross-section of the backlighting unit illustrated in FIG. 4A along FF' line.

FIG. 4C shows a section through the backlighting unit depicted in FIG. 4A along section line FF', which runs parallel to section line EE' and is arranged approximately in the center of waveguide plate 10.

Figure 4D:
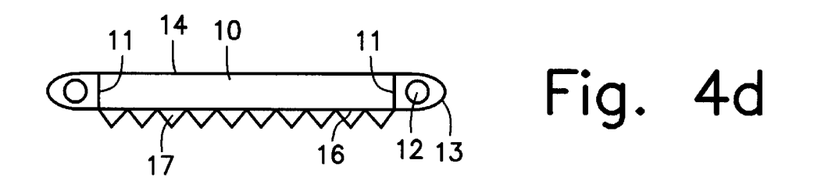
FIG. 4D shows a cross-section of the backlighting unit illustrated in FIG. 4A along GG' line.

FIG. 4D shows a section along section line GG', which is also parallel to section line EE' but runs close to the edge of waveguide 10 at the base of the U-shaped light source 12.

Figure 4E:
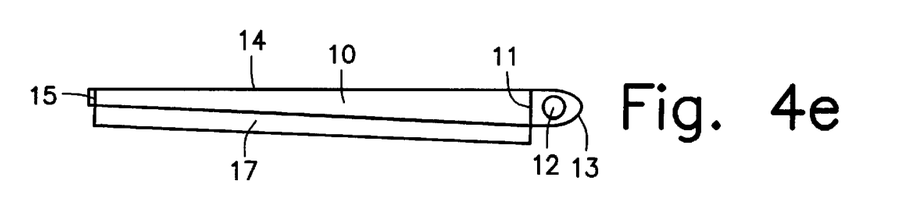
FIG. 4E shows a cross-section of the backlighting unit illustrated in FIG. 4A along HH' line.

Lastly, FIG. 4E depicts a section along section line HH', section line HH' being coincident with the longitudinal axis of the backlighting unit.

All FIGS. 4A–4E show a waveguide plate 10 which is equipped at its end surfaces with a backlighting unit 12 that is partially surrounded by a reflector 13. The upward-facing light exit surface 14 is planar, whereas underside 16 of waveguide 10 curves inward, resulting in a concave cross section in FIGS. 4B through 4D. Arranged on underside 16 of waveguide plate 10 are prisms 17 which all have the same cross-sectional area and the same cross-sectional shape, and extend parallel to section line EE', i.e. perpendicular to the longitudinal axis of the illumination unit.

The curvature of waveguide plate 10 is selected so that the waveguide plate is thinner where the light intensity is somewhat lower. The light is thus, so to speak, guided onto the prisms 17 in the regions of lesser light intensity, which in turn results in increased coupling-out efficiency.

Modifications of the exemplary embodiment depicted in FIG. 4A are possible, and provision is made therefor. For example, provision is made for configuring waveguide plate 10 in such a way that the curvature is applied on light exit surface 14, and the prisms on underside 16. This makes waveguide plate 10 easier to manufacture.

Provision is also made for prisms 17 on waveguide 10 to be rotated approximately 90 degrees, so that their ridge lines extend approximately perpendicular to the longitudinal axis of backlighting unit 12.

Figure 5:
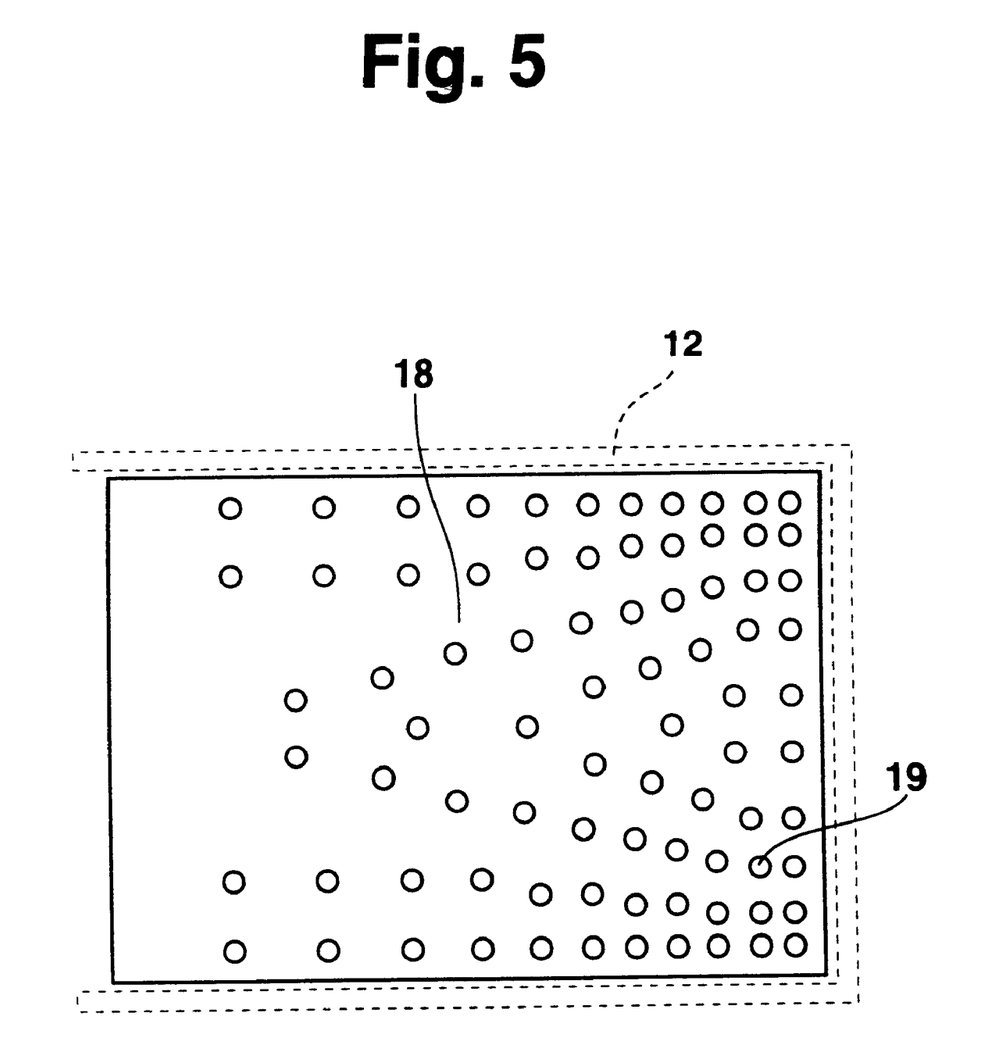
FIG. 5 shows a mirror for the backlighting element according to the present invention.

By mounting a mirror beneath the underside of waveguide plate 10, it is possible to direct more light from the light source to the light exit surface. FIG. 5 shows a mirror 18 that is provided for installation beneath waveguide plate 10. In addition, a light source 12 is depicted with dashed lines in FIG. 5 in order to elucidate the installation location of the mirror relative to the waveguide plate and the light source. The mirror is equipped at several spots with blackenings which reduce the reflectance of the mirror at that spot. A decrease in the coupling-out efficiency is thereby also achieved. If the blackenings are applied at those points where the light intensity in waveguide plate 10 is particularly high, the result of blackening 19 is a homogenization of the emitted light.

The term "blackening" as used above is intended to refer not only to the application of black color. "Blackening" in this context instead denotes a surface treatment in a manner suitable for reducing reflectance at the spots. This can be accomplished, for example, by etching the mirror surface, removing the metallization layer of the mirror, or applying an additional layer which acts in either absorbing or scattering fashion or as an anti-reflection layer.

Further possible modifications of the invention result from combinations of the various exemplary embodiments. For example, it is possible, and provision is made therefor, also to use a double-parabolic cross-sectional shape for the prisms in the exemplary embodiments shown in FIGS. 2A through 4E, since that allows collimation of the coupled-out light. A curved ridge line can also be used, allowing a more accurately adjustable homogenization of the light.

To improve the coupling-out efficiency, provision is made to equip the prisms additionally with a mirror layer. It is also possible, and provision is made therefor, to select the roof angle of the prisms in such a way that coupling out occurs below the particularly efficient total reflection. It is necessary in this case, however, for the light emerging through the light exit surface to be aligned parallel to the surface normal line. This can easily be accomplished by way of an additional film which follows after the backlighting unit.

It is furthermore possible, and provision is made therefor, to use an L-shaped or O-shaped lamp, or also to apply prisms on the light exit surface.

The prisms on the light exit surface can perform several functions. On the one hand, when the materials and the roof angle are selected appropriately, they reduce reflection back into the waveguide plate at the light exit surface, and thus enhance the coupling-out efficiency. On the other hand, light refraction at the side surfaces of the prisms causes the light to be directed in parallel fashion to a desired extent.

The prisms are preferably arranged on the light exit surface in such a way that their ridge lines are approximately perpendicular to the ridge lines of the prisms arranged on the underside. It is also advantageous, and provision is made therefor, additionally to provide the prisms on the light exit surface with a variable cross section or variable density, by analogy with the prisms arranged on the underside.

What is claimed is:

1. A backlighting unit for a planar homogeneous illumination, comprising:

a waveguide plate including at least two covering surfaces and at least two narrow sides, the waveguide plate being equipped with prisms which are located on at least one of the at least two covering surfaces; and a light source situated on at least two adjacent narrow sides, a light of the light source being capable of being optically coupled into the waveguide plate, wherein first regions of the waveguide plate have a first light intensity, a first number of the prisms per unit area and first dimensions for the prisms, wherein second regions of the waveguide plate have a second light intensity, a second number of the prisms per unit area and second dimensions for the prisms, the first light intensity being lower than the second light intensity, and wherein at least one of: i) the first number is greater than the second number, and ii) the first dimensions are larger than the second dimensions.

2. The backlighting unit according to claim 1, wherein the light source includes a cold-cathode fluorescent lamp.

3. The backlighting unit according to claim 1, wherein the light source is U-shaped.

4. The backlighting unit according to claim 1, wherein each of the prisms has a longitudinal axis.

5. The backlighting unit according to claim 4, wherein each of the prisms has a constant cross-sectional shape along the longitudinal axis.

6. The backlighting unit according to claim 5, wherein the prisms have an identical cross-sectional shape.

7. The backlighting unit according to claim 6, wherein the prisms have a cross-sectional shape of a triangle, each angle of the triangle having a predetermined value.

8. The backlighting unit according to claim 7, wherein lateral lines of the triangle are curved.

9. The backlighting unit according to claim 7, wherein lateral lines of the triangle are parabolically curved.

10. The backlighting unit according to claim 4, wherein the longitudinal axes are locally arranged approximately parallel to a direction of a light intensity gradient.

11. The backlighting unit according to claim 4, wherein the longitudinal axes are locally arranged approximately perpendicular to a direction of a light intensity gradient.

12. The backlighting unit according to claim 4, wherein the longitudinal axes are locally arranged approximately parallel, the first regions having a first depth of the prisms and a first width of the prisms, the second regions having a second depth of the prisms and a second width of the prisms, at least one of the first depth and the first width being greater than at least one of the second depth and the second width.

13. The backlighting unit according to claim 12, wherein the longitudinal axes are oriented approximately parallel to a symmetry axis of the backlighting unit.

14. The backlighting unit according to claim 13, wherein surfaces of the prisms are equipped with a reflective layer.

15. The backlighting unit according to claim 1, wherein the first number of the prisms per unit area is greater than the second number of the prisms per unit area and the first dimensions for the prisms are greater than the second dimensions for the prisms.

16. A backlighting unit for a planar homogeneous illumination, comprising:

a waveguide plate including at least two covering surfaces and at least two narrow sides, the waveguide plate being equipped with prisms which are located on at least one of the at least two covering surfaces, the at least two narrow sides including at least two narrow sides that are adjacent to one another; and a light source situated on the at least two adjacent narrow sides that are adjacent to one another, a light of the light source being optically coupled into the waveguide plate, wherein first regions of the waveguide plate have a first light intensity, a first number of the prisms per unit area and first cross-sectional areas for the prisms, wherein second regions of the waveguide plate have a second light intensity, a second number of the prisms per unit area and second cross-sectional areas for the prisms, the first light intensity being lower than the second light intensity, and wherein at least one of: i) the first number is greater than the second number, and ii) the first cross-sectional areas are larger than the second cross-sectional areas.

* * * * *

UNITED STATES PATENT AND TRADEMARK OFFICE
CERTIFICATE OF CORRECTION

PATENT NO.    : 6,330,386 B1
DATED         : December 11, 2001
INVENTOR(S)   : Wagner, A. et al.

It is certified that error appears in the above-identified patent and that said Letters Patent is hereby corrected as shown below:

<u>Title page, Item [54] and Column 1, line 1,</u>
Change the title "LIGHTENING UNIT" to read -- BACKLIGHTING UNIT --.

<u>Column 1,</u>
Line 38, delete the added spaces between the words "L-shaped         or U-shaped"

Signed and Sealed this

Twenty-fourth Day of December, 2002

JAMES E. ROGAN
*Director of the United States Patent and Trademark Office*